(12) United States Patent
Hsieh

(10) Patent No.: US 7,707,454 B2
(45) Date of Patent: Apr. 27, 2010

(54) METHOD FOR PROTECTING BACKUP DATA OF A COMPUTER SYSTEM FROM DAMAGE

(75) Inventor: An-Bang Hsieh, Taoyuan County (TW)

(73) Assignee: Lite-On Technology Corporation, Taipei (TW)

( * ) Notice: Subject to any disclaimer, the term of this patent is extended or adjusted under 35 U.S.C. 154(b) by 413 days.

(21) Appl. No.: 11/521,637

(22) Filed: Sep. 14, 2006

(65) Prior Publication Data

US 2007/0074068 A1    Mar. 29, 2007

(30) Foreign Application Priority Data

Sep. 28, 2005  (TW) .............................. 94133731 A

(51) Int. Cl.
*G06F 11/00* (2006.01)
(52) U.S. Cl. ................. 714/6; 714/5; 711/162
(58) Field of Classification Search ............... 714/5, 714/6, 42; 711/162
See application file for complete search history.

(56) References Cited

U.S. PATENT DOCUMENTS

| | | | |
|---|---|---|---|
| 5,386,552 A * | 1/1995 | Garney ..................... 714/10 |
| 6,073,220 A * | 6/2000 | Gunderson ................ 711/162 |
| 6,108,792 A * | 8/2000 | Hanaoka .................... 713/323 |
| 6,243,809 B1 * | 6/2001 | Gibbons et al. ............ 713/1 |
| 6,336,161 B1 * | 1/2002 | Watts ......................... 711/103 |
| 6,453,278 B1 * | 9/2002 | Favor et al. ................ 703/27 |
| 6,611,850 B1 * | 8/2003 | Shen ......................... 707/204 |
| 7,024,527 B1 * | 4/2006 | Ohr ........................... 711/161 |
| 2005/0044453 A1 * | 2/2005 | Dunstan et al. ............ 714/43 |
| 2005/0188278 A1 * | 8/2005 | Zimmer et al. ............. 714/42 |
| 2006/0282602 A1 * | 12/2006 | Liao et al. .................. 710/310 |

* cited by examiner

*Primary Examiner*—Yolanda L Wilson
(74) *Attorney, Agent, or Firm*—Quintero Law Office

(57) ABSTRACT

Methods for protecting backup data of a computer system from damage are disclosed. A first storage device is provided for storing the backup data of the computer system, wherein the first storage device is ordinarily disabled to prevent the operating system of the computer system from accessing the backup data. A pin on the motherboard of the computer system is triggered by the Basic Input Output System (BIOS) of the computer system to enable or disable the first storage device. A first software system management interrupt is then initiated to call the BIOS to enable the first storage device. The backup data stored in a second storage device of the computer system is then copied to the first storage device. Finally, a second software system management interrupt is initiated to call the BIOS to disable the first storage device after copying of the backup data is complete.

20 Claims, 3 Drawing Sheets

METHOD FOR PROTECTING BACKUP DATA OF A COMPUTER SYSTEM FROM DAMAGE

BACKGROUND OF THE INVENTION

1. Field of the Invention

The invention relates to computer systems, and more particularly to data protection in computer systems.

2. Description of the Related Art

Because computers are a daily necessity, users suffer greatly if their computer or data stored thereon is damaged due to viruses or hackers. The information technology industry, therefore, focuses great effort on methods for preventing computer data from viruses and hackers and for restoring computer data after damaged by viruses.

A computer virus is typically a short, self-replicating program segment that infects applications resident on a computer system. When the infected program is executed, the instructions of the computer virus cause the data and operating system of the computer system to malfunction. A virus may infect computer systems when an infected disk is read or when an infected file is downloaded via a network or electronic mail. The virus may infect execution files, the file allocation table (FAT), or the boot sector of a computer system. If the FAT of a computer is damaged, the computer cannot accurately locate files on a hard disk and no files can be read. If the boot sector storing operating system code is damaged, the operating system can not be loaded into main memory for execution, and the computer cannot boot.

A great number of anti-virus software applications for preventing computer viruses and hacking are currently available. Viruses, however, continue to infect computers, even if anti-virus software is installed. Thus, essential data must be backed up in advance, to prevent loss and enable restoration of said data in the event of infection by a virus.

Several methods for restoring backup data to a computer system are available. Current solutions often allocate a portion of hard disk space storing backup data. Users execute an application for backing up system data under control of the operating system. If system data is damaged, the operating system calls the application to restore backup data. If the FAT is damaged, however, the backup data stored in the hard disk cannot be retrieved, and the system data cannot be restored. If the boot sector is damaged, the operating system code cannot be loaded, and the application cannot be executed to restore backup data.

BRIEF SUMMARY OF THE INVENTION

Methods for protecting backup data of a computer system from damage are provided. In an exemplary embodiment of a method for protecting backup data, a first storage device is provided for storing backup data. The first storage device is ordinarily disabled to prevent the operating system of the computer system from accessing the backup data. A pin on the motherboard of the computer system is triggered by the Basic Input Output System (BIOS) of the computer system to enable or disable the first storage device. A first software system management interrupt is then initiated to call the BIOS to enable the first storage device. The backup data stored in a second storage device of the computer system is then copied to the first storage device. Finally, a second software system management interrupt is initiated to call the BIOS to disable the first storage device after copying of the backup data is complete.

A method for protecting backup data of a computer system from damage is also provided. First, a first storage device is provided for storing the backup data of the computer system, wherein the first storage device is ordinarily write-protected to prevent the operating system of the computer from accessing the backup data. A pin on the motherboard of the computer system is triggered by the BIOS of the computer system to switch the first storage device between a writable status and a write-protected status. A first software system management interrupt is then initiated to call the BIOS to switch the first storage device to the writable status. The backup data stored in a second storage device of the computer system is then copied to the first storage device. Finally, a second software system management interrupt is initiated to call BIOS to switch the first storage device to the write-protected status after the copy of the backup data is complete.

Computer systems for protecting backup data from damage are provided. An exemplary embodiment of a computer system includes a central processing unit (CPU), a first storage device, a first storage device controller, and a south-bridge chipset. The central processing unit controls operation of the computer system. The first storage device stores the backup data of the computer system, wherein the first storage device is ordinarily disabled to prevent the operating system of the computer system from accessing the backup data. The controller of the first storage device controls the first storage device. The south-bridge chipset coupled between the CPU and the controller of the first storage device triggers a pin of the south-bridge chipset according to the BIOS of the computer system to enable or disable the first storage device. The computer system initiates a first software system management interrupt to call the BIOS to enable the first storage device, copies the backup data stored in a second storage device of the computer system to the first storage device, and initiates a second software system management interrupt to call the BIOS to disable the first storage device after copying of the backup data is complete.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
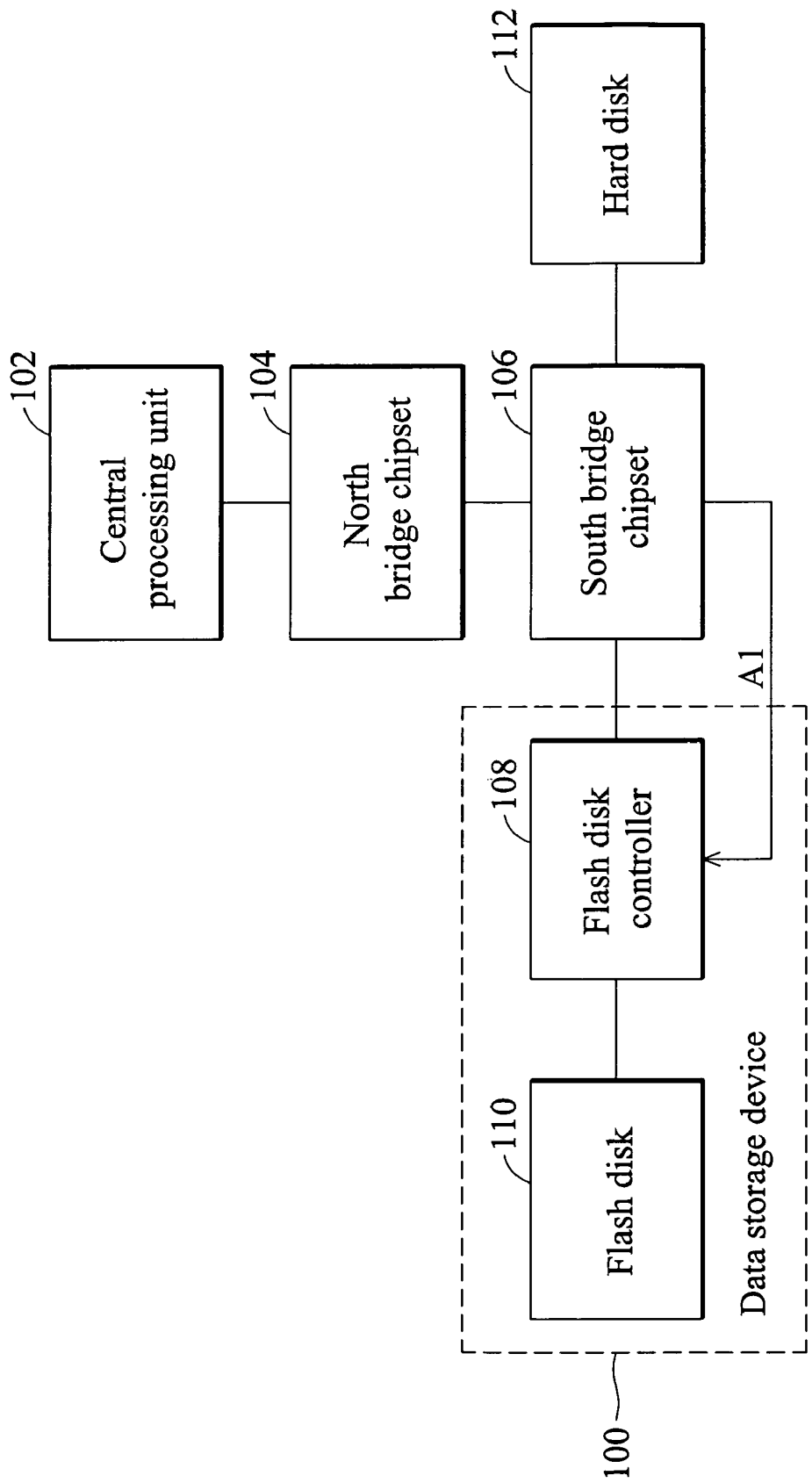
FIG. 1 is a block diagram of an embodiment of a computer system protecting backup data from damage according to the invention.

FIG. 1 is a block diagram of a computer system protecting backup data from damage according to the invention. The computer system includes a data storage device 100 storing backup data of the computer system. The data storage device 100 is independent of the hard disk 112 storing the operating system code and data of the computer system. The data storage device 100 is coupled with the central processing unit (CPU) 102 of the computer system through a south bridge chipset 106, which is further coupled to a north bridge chipset 104. In some embodiments, the data storage device 100 includes a flash disk 110 and a flash disk controller 108 controlling operation of the flash disk 110. The CPU 102 negotiates with the flash disk controller 108 through the south bridge chipset 106 to access data stored in the flash disk 110. A pin A1 of the south bridge chipset 106 can enable or disable the flash disk controller 108, or switch the flash disk 110 between a writable status and a write-protected status. The described interconnection between the elements of the computer system is provided as an example and is not intended to limit the invention. Other types of storage devices in addition to flash disk 110, can serve as data storage device 100. Moreover, data storage device 100 need not necessarily be coupled to the south bridge chipset 106 through the pin A1. The data storage device 100 may, for example, be connected to the south bridge chipset 106 or CPU 102 through the Integrated Drive Electronics (IDE) interface, Universal Serial Bus (USB) interface, or Peripheral Component Interconnect (PCI) interface.

Figure 2:
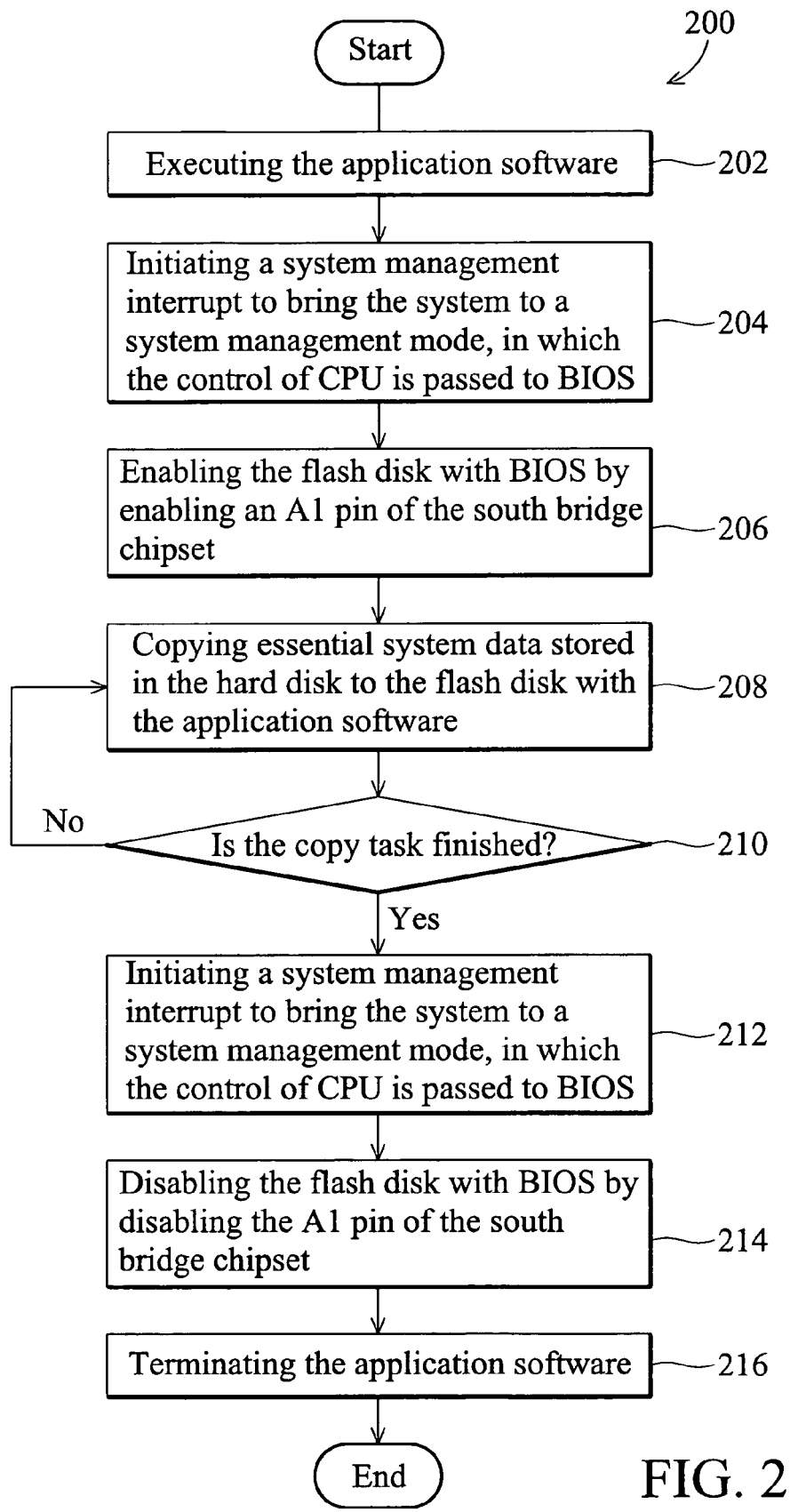
FIG. 2 is a flowchart of an embodiment of a method for backing up data of a computer system according to the invention.

FIG. 2 is a flowchart of an embodiment of a method 200 for backing up data of a computer system. An application of the computer system can implement method 200 to back up essential system data for subsequent data restoration. The application software is first executed in step 202, which initiates a software system management interrupt (SMI) in step 204 to pass the control of the CPU from the operating system to the basic input output system (BIOS).

SMI is the interrupt having the highest priority in the Intel x86 series CPU. When a CPU receives an SMI, the operating system of the computer halts and hands over control of the CPU to a system management memory (SMRAM) area of the basic input output system (BIOS) of the computer. At this time, the computer system enters a system management mode (SMM), in which the SMRAM area of the BIOS performs certain tasks in response to the system management interrupt. Because the operating system can only access the main memory and cannot access the SMRAM area of the BIOS, the operating system is not able to intervene in tasks performed under the system management mode. After the tasks are finished, control of the CPU again passes to the operating system, and the computer system exits the system management mode. Typically, SMIs are used for power management and virus checking. SMIs can be further classified into a software SMI initiated by software program and a hardware SMI initiated by hardware device. The invention uses software SMI to back up system data.

Once the system management interrupt is initiated by the application software in step 204, the computer system enters the system management mode, and control of the CPU passes from the operating system to the BIOS. The BIOS then enables the flash disk 110 of the data storage device 100 in step 206 by enabling the A1 pin of the south bridge chipset 106. Thus, flash disk 110 is enabled or switched to a writable status. The application can then copy essential system data stored in the hard disk 112 to the flash disk 110 in step 208 for future restoration. If the copy of system data is finished in step 210, the application software again initiates the system management interrupt in step 212 to bring the computer into the system management mode and pass control of the CPU to the BIOS. The BIOS then disables the flash disk 110 of the data storage device 100 in step 214 by disabling pin A1 of the south bridge chipset 106. Thus, the flash disk 110 is switched to a write-protected status. The purpose of disabling the flash disk is to prevent the operating system from accessing the backup data stored in the flash disk 110, because a virus or Trojans invading the computer system may utilize the operating system to damage the backup data. If the flash disk 110 is disabled, the flash disk 110 will not respond to a scan of the operating system, and the operating system will be unaware of the existence of flash disk 110. Likewise, viruses and Trojans will be unaware of the existence of the flash disk 110, and thus cannot damage data stored in the flash disk 110. If the flash disk 110 is switched to a write-protected status, the operating system cannot change the backup data stored in the flash disk 110, further preventing viruses from damaging the backup data. After the flash disk 110 is disabled in step 214, the computer system will exit the system management mode, and control of the CPU is passed to the operating system. Finally, because the backup task is finished, the application software is terminated in step 216.

Figure 3:
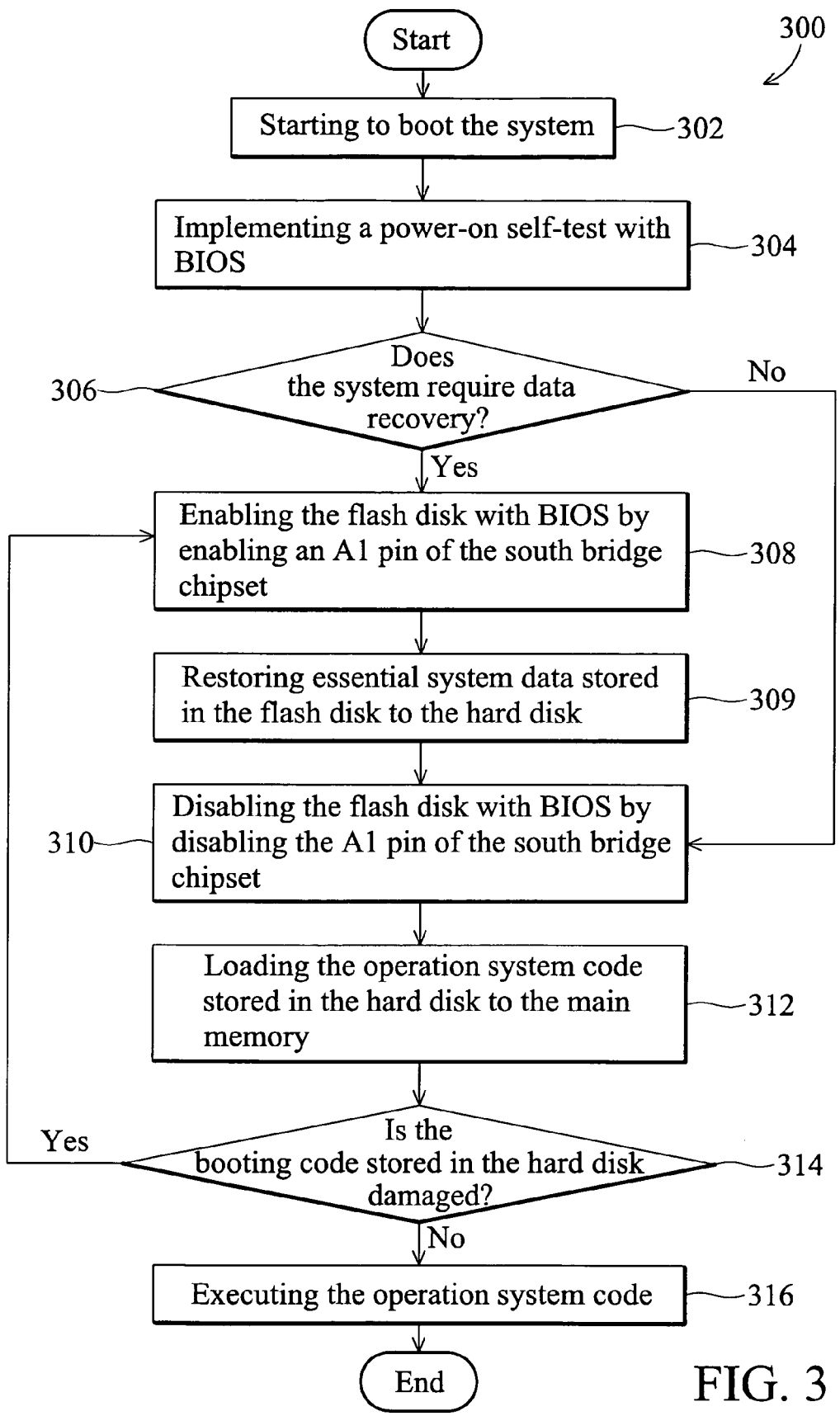
FIG. 3 is a flowchart of an embodiment of a method for restoring backup data of the computer system according to the invention.

FIG. 3 is a flowchart of an embodiment of a method 300 for restoring backup data. The data of the computer system is assumed to be damaged due to virus infection or hacker invasion. The computer system is first booted in step 302. A power-on self test is automatically implemented by the BIOS in step 304 during boot up. After the test has concluded, step 306 determines whether the computer system requires restoration of backup data. This can be determined by the user of the computer. A predetermined hot key can trigger the backup data restoration, and the BIOS can detect if the hot key is pressed to determine whether data restoration is to be executed. If no key press event is received during a predetermined period, the BIOS disables flash disk 110 in step 310 or switches the flash disk 110 to a write-protected status. If key press event occurs in step 306, the BIOS enables the flash disk 110 in step 308. The BIOS enables pin A1 of the south bridge chipset 106 to enable the flash disk 110 in step 308. The backup data stored in the flash disk 110 is then restored to the hard disk 112 in step 309.

After the backup data is restored, the BIOS disables the A1 pin of the south bridge chipset 106 to disable the flash disk 110 in step 310. Thus, the flash disk 110 is disabled or switched to a write-protected status, and a virus or hacker cannot infect or invade the operating system to change the backup data stored in the flash disk 110. The backup data, therefore, is not damaged even if the operating system of the computer is infected. The operating system code is then loaded from hard disk 112 to the main memory in step 312. If the boot sector of hard disk 112 is damaged and the user did not restore backup data in step 306, the operating system code cannot be loaded into the main memory in step 314. Thus, the BIOS automatically returns to step 308 to store backup data, as steps 308, 309, and 310, and the operating system code stored in boot up sector is restored. If the operating system code is successfully loaded from hard disk 112 to the main memory in step 312, the operating system is executed in step 316, and the computer system can be used. Thus, the backup data can be automatically restored during boot up of the computer system.

Methods for protecting backup data of a computer system from damage are provided. The backup data is stored in a data storage device independent of the hard disk of the computer system, thereby preventing the operating system from accessing the backup data. When the computer system determines essential data is to be backed up to the data storage device, a system management interrupt is initiated to call the BIOS to enable the data storage device, and data can be copied to the data storage device. The restoration of backup data is also executed by the BIOS during boot up. Because the data storage device storing backup data is ordinarily disabled or write-protected, the backup data is invisible to the operating system, thereby preventing viruses and hackers from infecting or invading the backup data. Thus, the backup data is protected from damage.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for protecting backup data of a computer system from damage, comprising:

providing a first storage device connected to the computer system for storing the backup data of the computer system, wherein the first storage device is by default disabled by a pin on the motherboard of the computer system such that the operating system of the computer system is prevented from accessing the first storage device;

initiating a first software system management interrupt to call the Basic Input Output System (BIOS) of the computer system to enable the first storage device by triggering the pin on the motherboard of the computer system such that the first storage device is accessible to the operating system of the computer system;

copying the backup data stored in a second storage device of the computer system to the first storage device; and after the cony of the backup data is complete, initiating a second software system management interrupt to call the BIOS to disable the first storage device by triggering the pin on the motherboard of the computer system such that the operating system of the computer system is once again prevented from accessing the first storage device.

2. The method as claimed in claim 1, wherein the method further comprises:

when data stored in the second storage device is damaged, calling the BIOS to enable the first storage device;

restoring the backup data from the first storage device to the second storage; and calling the BIOS to disable the first storage device after the restoration is complete.

3. The method as claimed in claim 2, wherein the restoration of the backup data is started according to a key-press event during boot up of the computer system.

4. The method as claimed in claim 2, wherein the restoration of the backup data is automatically started if the operating system of the computer system cannot be loaded to a main memory of the computer system from the second storage device.

5. The method as claimed in claim 1, wherein the pin is located on a south-bridge chipset of the computer system, and the pin is coupled to a controller of the first storage device.

6. The method as claimed in claim 1, wherein the first storage device is a flash disk.

7. The method as claimed in claim 1, wherein the second storage device is a hard disk.

8. The method as claimed in claim 1, wherein the first storage device is coupled to the motherboard of the computer system through Integrated Drive Electronics (IDE) interface, Universal Serial Bus (USB) interface, or Peripheral Component Interconnect (PCI) interface.

9. A method for protecting backup data of a computer system from damage, comprising:

providing a first storage device connected to the computer system for storing the backup data of the computer system, wherein the first storage device is by default write-protected to prevent the operating system of the computer system from accessing the backup data;

triggering a pin on the motherboard of the computer system with the Basic Input Output System (BIOS) of the computer system to switch the first storage device between a writable status and a write-protected status;

initiating a first software system management interrupt to call the BIOS to switch the first storage device to the writable status before the backup data is copied to the first storage device;

copying the backup data stored in a second storage device of the computer system to the first storage device; and initiating a second software system management interrupt to call the BIOS to switch the first storage device to the write-protected status after the copy of the backup data is complete.

10. The method as claimed in claim 9, wherein the method further comprises restoring the backup data from the first storage device to the second storage device if data stored in the second storage device is damaged.

11. The method as claimed in claim 10, wherein the restoration of the backup data is started according to a key-press event during boot up of the computer system.

12. The method as claimed in claim 10, wherein restoration of the backup data begins automatically if the operating system of the computer system cannot be loaded to a main memory of the computer system from the second storage device.

13. The method as claimed in claim 9, wherein the pin is located on a south-bridge chipset of the computer system, and the pin is coupled to a controller of the first storage device.

14. The method as claimed in claim 9, wherein the first storage device is a flash disk.

15. The method as claimed in claim 9, wherein the second storage device is a hard disk.

16. The method as claimed in claim 9, wherein the first storage device is coupled to the motherboard of the computer system through Integrated Drive Electronics (IDE) interface, Universal Serial Bus (USB) interface, or Peripheral Component Interconnect (PCI) interface.

17. A computer system for protecting backup data from damage, comprising:

a first storage device, storing the backup data of the computer system, wherein the first storage device is by default disabled such that the operating system of the computer system is prevented from accessing the first storage device;

a controller of the first storage device, coupled to the first storage device, controlling the first storage device;

a south-bridge chipset, coupled to the controller of the first storage device, the south-bridge chipset comprising a pin configured to be triggered by a Basic Input Output System (BIOS) of the computer system to enable or disable the first storage device;

a central processing unit (CPU), coupled to the south-bridge chipset, controlling operation of the computer system, configured such that when a first software system management interrupt is initiated, the BIOS is called to enable the first storage device via the south-bridge chipset such that the first storage device is accessible to the operating system of the computer system, the backup data stored in a second storage device of the computer system is copied to the first storage device, and after copying of the backup data is complete, a second software system management interrupt is initiated to call the BIOS to disable the first storage device via the south-bridge chipset such that the operating system of the computer system is once again prevented from accessing the first storage device.

18. The computer system as claimed in claim 17, wherein the CPU is configured such that when data stored on the second storage device is damaged, the BIOS is called to enable the first storage device, the backup data from the first storage device is restored to the second storage device, and the BIOS is called to disable the first storage device after restoration is complete.

19. The computer system as claimed in claim 17, wherein the first storage device is a flash disk.

20. The computer system as claimed in claim 17, wherein the second storage device is a hard disk.

* * * * *